(12) United States Patent
Varkey et al.

(10) Patent No.: US 8,069,879 B2
(45) Date of Patent: Dec. 6, 2011

(54) HYDROCARBON APPLICATION HOSE

(75) Inventors: Joseph Varkey, Sugar Land, TX (US); Willem A. Wijnberg, Houston, TX (US); Montie W. Morrison, Sugar Land, TX (US); Sheng Chang, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1101 days.

(21) Appl. No.: 11/830,908

(22) Filed: Jul. 31, 2007

(65) Prior Publication Data

US 2008/0066822 A1   Mar. 20, 2008

Related U.S. Application Data (60) Provisional application No. 60/825,729, filed on Sep. 15, 2006.

(51) Int. Cl.
*F16L 11/00* (2006.01)

(52) U.S. Cl. ......... 138/137; 138/140; 138/141; 138/133

(58) Field of Classification Search .................. 138/137, 138/140, 133, 132; 428/36.9
See application file for complete search history.

(56) References Cited

U.S. PATENT DOCUMENTS

| | | |
|---|---|---|
| 2,604,509 A | 7/1952 | Blanchard |
| 3,115,542 A | 12/1963 | Palandri et al. |
| 3,217,083 A | 11/1965 | Gore |
| 4,131,757 A | 12/1978 | Felkel |
| 4,131,758 A | 12/1978 | Felkel |
| 4,523,804 A | 6/1985 | Thompson |
| 4,645,298 A | 2/1987 | Gartside, III |
| 4,675,474 A | 6/1987 | Neuroth |
| 4,979,795 A | 12/1990 | Mascarenhas |
| 5,329,605 A | 7/1994 | Wargotz |
| 5,431,759 A | 7/1995 | Neuroth |
| 5,495,547 A | 2/1996 | Rafie et al. |
| 5,908,049 A * | 6/1999 | Williams et al. ............... 138/125 |
| 5,921,285 A * | 7/1999 | Quigley et al. ............... 138/125 |

(Continued)

FOREIGN PATENT DOCUMENTS

JP   54-7186   1/1979

(Continued)

OTHER PUBLICATIONS

S.M. Lebedev, O.S. Gefle, Yu.P.Pokholkov and V.I. Chichikin, "The Breakdown Strength of Two-Layer Dielectrics", High Voltage Engineering Symposium, Aug. 22-27, 1999, Tomsk Polytechnic University, Tomsk, Russia #4.304.P2.

(Continued)

*Primary Examiner* — Patrick F Brinson
(74) *Attorney, Agent, or Firm* — Michael L. Flynn; David Hofman; Jody Lynn Destefanis (57) ABSTRACT

A hydrocarbon application hose to avoid substantial compression and blow-out resulting from high pressurization differentials therethrough. The hose is formed from an inner tube that has a layer of material with electromagnetic target, such as carbon fiber, disbursed therethrough. In this manner, the material, generally a polymer, may be electromagnetically heated once the layer has been wrapped with a metallic reinforcing member. Thus, the layer of material may transform into surrounding relation relative to the reinforcing member. A substantially unitary inner tube may thereby be provided that includes a reinforcing member for blowout resistance and is of unitary character for compression resistance.

21 Claims, 6 Drawing Sheets

U.S. PATENT DOCUMENTS

| | | | |
|---|---|---|---|
| 6,004,639 A * | 12/1999 | Quigley et al. | 428/36.3 |
| 6,016,845 A * | 1/2000 | Quigley et al. | 138/125 |
| 6,030,255 A | 2/2000 | Konishi et al. | |
| 6,060,662 A | 5/2000 | Rafie et al. | |
| 6,195,487 B1 | 2/2001 | Anderson et al. | |
| 6,211,467 B1 | 4/2001 | Berelsman et al. | |
| 6,403,889 B1 | 6/2002 | Mehan et al. | |
| 6,538,198 B1 * | 3/2003 | Wooters | 174/47 |
| 6,555,752 B2 | 4/2003 | Dalrymple et al. | |
| 6,600,108 B1 | 7/2003 | Mydur et al. | |
| 2004/0262027 A1 | 12/2004 | Kaczmarski | |

FOREIGN PATENT DOCUMENTS

| | | |
|---|---|---|
| JP | 2-216710 | 2/1990 |
| WO | 99/48111 | 9/1999 |

OTHER PUBLICATIONS

M.M.A. Salama, R. Hackman, Fellow and A.Y. Chikhani, Sr., "Instructional Design of Multi-Layer Insulation of Power Cables", Transaction on Power Systems, vol. 7, No. 1, Feb. 1992, pp. 377-382.

* cited by examiner

FIG. 6

HYDROCARBON APPLICATION HOSE

CROSS REFERENCE TO RELATED APPLICATION(S)

This Patent Document claims priority under 35 U.S.C. §119(e) to U.S. Provisional Application Ser. No. 60/825,729, entitled Compression and Blowout Resistant Cable with Cuttings Removal and Fluid Pumping Capabilities for use in Drilling, filed on Sep. 15, 2006 which is incorporated herein by reference.

FIELD

Embodiments described relate to hoses for transporting fluid or air through an environment of an oilfield. In particular, embodiments of hoses for hydrocarbon exploration and production applications are described.

BACKGROUND

A variety of hydrocarbon exploration and other applications involve the use of cables and hoses. The cables and hoses may be employed to provide a link between an underwater or subterranean hydrocarbon environment and a surface location. Operators of hydrocarbon application equipment may be positioned at the surface location. From this location, hydrocarbon tools therebelow may be directed and serviced through the noted hydrocarbon application cables and hoses. Examples of hydrocarbon application hoses in particular may include seismic gun hoses for carrying pressurized air, drilling hoses for transfer of cuttings and drilling fluid, and even coiled tubing for delivering pressurized fluid and tools to a downhole environment.

Hydrocarbon application hoses such as those noted above generally include an inner core of a polymer such as nylon or polytetrafluoroethylene (PTFE) that is surrounded by a reinforcing braided or served stress member, that is, one which is cabled or wrapped. A jacket will also generally be employed encasing such hose components and providing the outer surface of the hose. The reinforcing stress member may be an aramid fiber such as Kevlar™ or other suitable material constructed to help prevent blowout of the hose. That is, for many hydrocarbon applications, pressurized fluid or air may be driven through the hose. Thus, a reinforcing stress member may be employed to help ensure that the pressure driven through the hose does not lead to blowout of the hose which could render it ineffective. Blowout may also render any hydrocarbon equipment or tools coupled to the hose susceptible to damaging environmental conditions surrounding the hose. Thus, effective reinforcement may be critical to the operation of a hydrocarbon hose.

As indicated, the reinforcing member is often a Kevlar™ braid surrounding the core of the hose. Kevlar™ is a fairly lightweight and flexible material. It is also a strong material with a strength-to-weight ratio that is about 5 times stronger than steel on an equal weight basis. Thus, while providing a degree of flexibility it is also particularly well suited to help avoid blowout of a hydrocarbon application hose when extreme pressures are driven through the core of the hose. While the reinforcing member may adequately avoid blowout of the hose, its flexible nature fails to help avoid compression of the hose, for example when directed through a high pressure differential environment. Therefore, the jacket of the hydrocarbon application hose is often of a stiffer material able to withstand high differential pressures while better avoiding collapse and deformation.

Where the hydrocarbon application is a coiled tubing application, a stainless steel outermost jacket may be employed to ensure that the coiled tubing hose is able to adequately withstand high downhole differential pressures without significant collapse or deformation. However, such a stainless steel jacket leaves the coiled tubing hose prone to fatigue over time as it is repeatedly spooled into and out of a well, undergoing plastic deformation as it is straightened and wound over and over. The likelihood of this fatigue resulting in rupture of the hose increases as the amount of deformation increases, for example as the overall size of the hose increases in terms of its diameter. Thus, the outer diameter of the coiled tubing hose may be limited, generally, to less than about 1.5 inches.

In addition to concern over fatigue from the employment of a metal or other relatively inflexible jacket, there are drawbacks to the use of aramid and other porous material fibers to make up the reinforcing member. For example, a Kevlar yarn, comprised of many thousands of small circular fibers, in particular is a very porous element. Therefore, a significant amount of air is generally trapped within the layer of Kevlar reinforcing member. As a result, any breakdown in the jacket material leaves the entire hose immediately vulnerable to collapse when present within a high pressure differential environment. That is, once leakage of high differential pressure fluid or air traverses the jacket, a conventional porous aramid fiber reinforcing member is unable to withstand compressive forces exerted thereon. The hydrocarbon application hose thus collapses.

Unfortunately, there is presently no adequate manner of eliminating the porosity of aramid fiber bundles in order to provide an added or alternate line of defense to the hose when subjected to a high pressure differential environment. Kevlar™, for example, is a highly finished material that generally includes slick and oily filament surfaces rendering it difficult to fill or otherwise eliminate its porosity. Alternatively, where metal armor or wire material is employed as a reinforcing member it is subjected to processing conditions that render it brittle and often of reduced effectiveness in preventing hose blowout. That is, the metal reinforcing member may be integrated into the core material of the hose to eliminate porosity. However, conditions under which the metal is subjected in order to achieve this integration are likely to leave the metal brittle and ineffective.

SUMMARY

A method of forming a hydrocarbon application hose is described wherein a layer of material is provided. The material includes an electromagnetic target disbursed therethrough. The layer is covered with a reinforcing member and electromagnetic heating is applied to transform the material into surrounding relation with the reinforcing member.

DETAILED DESCRIPTION

Embodiments are described with reference to certain hydrocarbon application hoses. Particular configurations of coiled tubing, umbilical drilling, and seismic gun hoses are described. However, a variety of configurations may be employed. Regardless, embodiments described may include a layer of material with an electromagnetic target disbursed therethrough to allow it to come into surrounding relation with a reinforcement member upon electromagnetic heating. This may be achieved in a manner that is substantially harmless to the reinforcement member.

Figure 1:
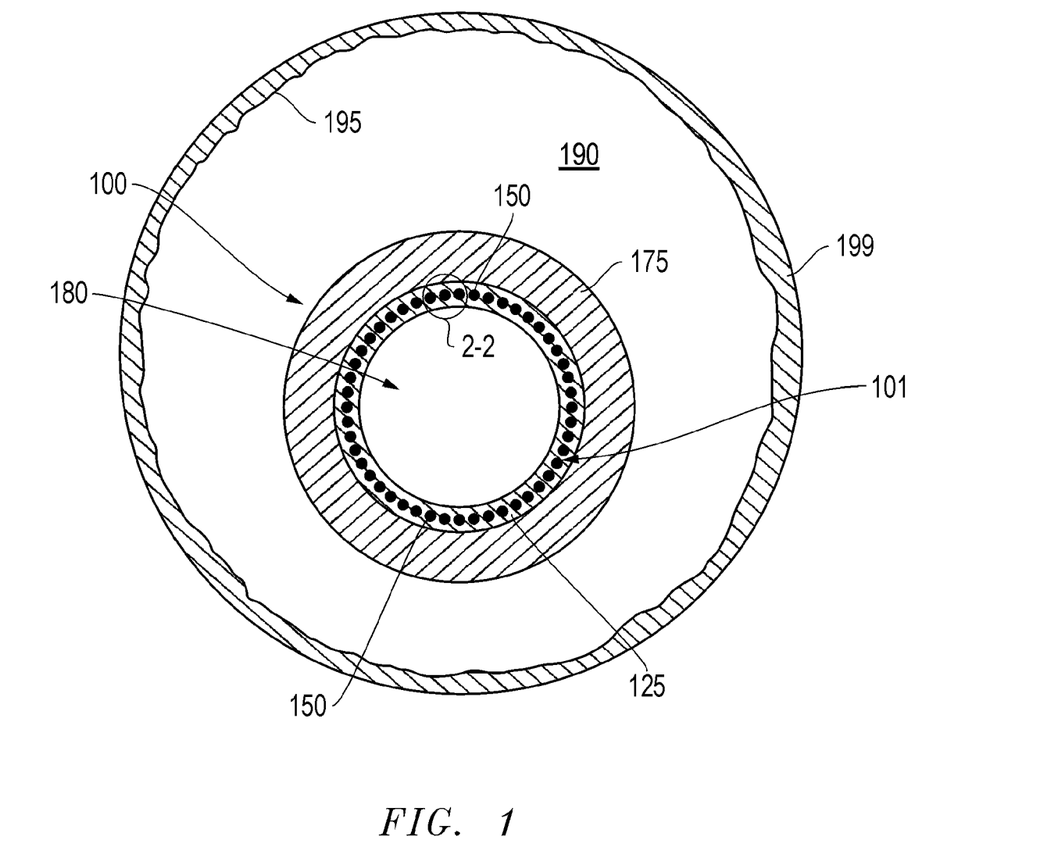
FIG. 1 is a front cross-sectional view of an embodiment of a hydrocarbon application hose disposed within a well.

Referring now to FIG. 1 an embodiment of a hydrocarbon application hose 100 is depicted within a hydrocarbon well 190 defined by a well wall 195. The hose 100 is configured to carry a variety of pressures through its central passageway 180. For example, even with an outer diameter exceeding about 1.5 inches, in one embodiment the hose 100 may carry pressures from atmospheric up to about 20,000 PSI or more depending on the application to be performed within the well 190. Additionally, the well 190 itself may provide a high pressure environment extending several thousand feet below surface (see FIG. 4). Thus, depending on the particular circumstances, an extremely high pressure differential may exist between the central passageway 180 and the well 190. Therefore, as detailed herein below, the hydrocarbon application hose 100 is configured to withstand high differential pressure through the passageway 180 to avoid blowout, while also withstanding high differential pressure from an external environment such as the well 190, thereby avoiding compressive deformation. That is, the hose 100 is a compression and blowout resistant hydrocarbon application hose.

Figure 2:
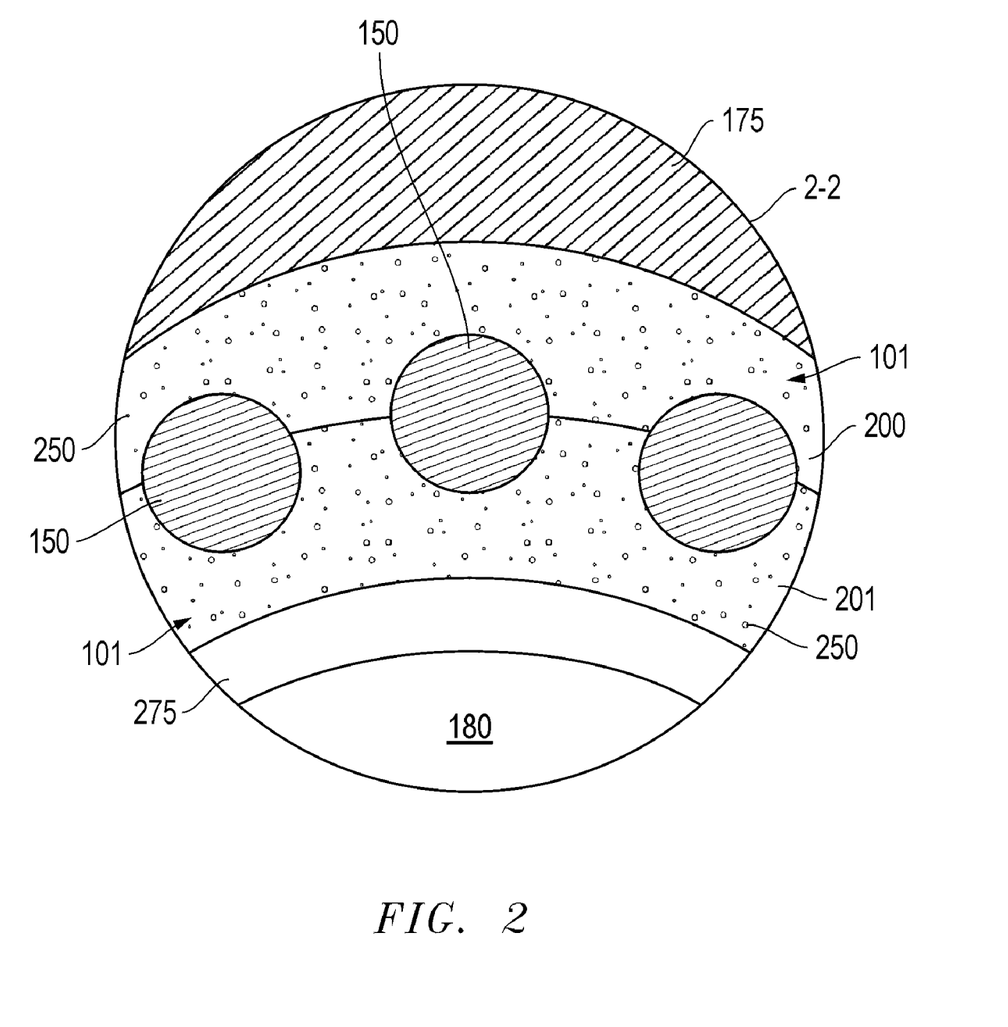
FIG. 2 is an enlarged cross-sectional view of the hydrocarbon application hose of FIG. 1 taken from 2-2.
Figure 4:
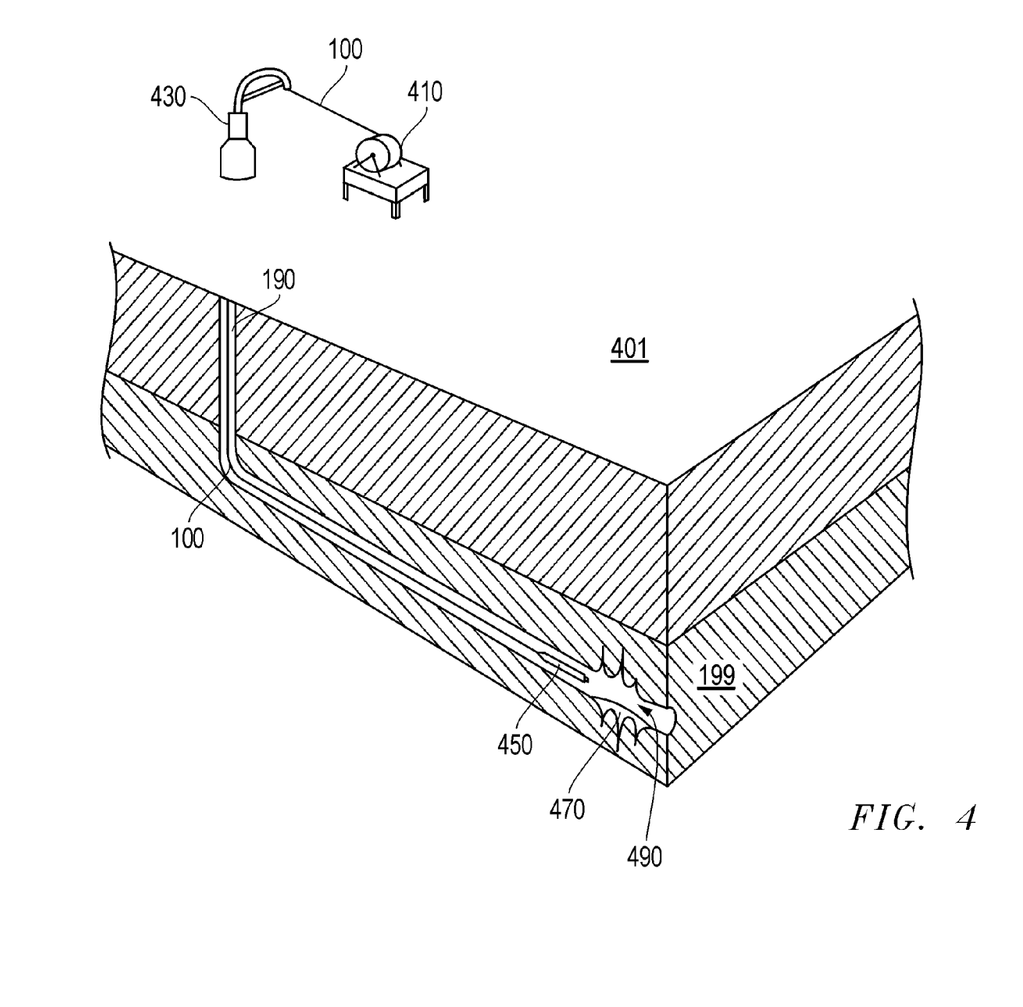
FIG. 4 is an overview of the hydrocarbon application hose of FIGS. 1 and 2 employed in a fracturing operation at an oilfield.

Continuing with reference to FIGS. 1 and 2, with added reference to FIG. 4, the hose 100 may include a conventional outer jacket 175 substantially isolating the remainder of the hose 100 from an outside environment and pressures associated therewith. For example, in the embodiments of FIGS. 1, 2, and 4, the hose 100 may serve as coiled tubing configured for delivering a clean out tool 450 or other device through the well 190 where it is of a horizontal or highly deviated architecture. For such an application, the jacket 175 may be a deformable carbon or stainless steel pipe or other conventional material. Alternatively, given that such materials are prone to fatigue upon repeated deformation, the jacket 175 may be eliminated altogether. In such an embodiment a bare inner tube 101 detailed below, may be appropriately sized and employed as the hose 100 without any jacket. This alternate configuration of the hose 100 may be possible due to the robust and monolithic or unitary character of the inner tube 101 substantially lacking in porosity.

In a conventional hose employing a porous reinforcing member, for example, Kevlar™, immediately below a jacket 175 such as that of FIGS. 1 and 2, the jacket 175 helps to avoid collapse of the hose 100 in the event of high differential pressure surrounding the hose 100 (e.g. within the well 190). However, in the embodiments depicted here the inner tube 101 of the hose 100 immediately inside of the jacket 175 is essentially monolithic or of unitary configuration relative to its various components 150, 200, 201. That is, in spite of having a variety of different components 150, 200, 201, the inner tube 101 is substantially devoid of any air or open space therethrough. Thus, failure of the outer jacket 175 at a location due to fatigue may occur without any significant collapse of the hose 100.

For example, with particular reference to FIG. 1, a pressurized influx of fluid from the well 190 may be avoided even where the jacket 175 is cracked at a location and fails to completely isolate the inner tube 101 from the well environment. The substantially monolithic non-porous character of the inner tube 101 provides no avenue for such an influx of pressurized fluid. In fact, in the alternate embodiment referenced above, the compression resistant jacket 175 may be eliminated entirely and the inner tube 101 configured of appropriate size, thickness, and rigidity to withstand differential pressures likely to be encountered during an application.

The inner tube 101 of FIGS. 1 and 2 includes a variety of different components 150, 200, 201 that are brought together in such a manner as to provide the substantially unitary character noted above. One of these components may be a base material layer 201 that is disposed about a material core 275. The material core 275 may define the central passage of the hose 100 whereas the base material layer 201 may be of a material compatible for bonding to the material of the material core 275. For example, in one embodiment, the material core 275 is of a given polymer whereas the base material layer 201 is made up of primarily the same polymer.

The base material layer 201 may include an electromagnetic target 250 disbursed therethrough. A reinforcing member 150 may be longitudinally coupled in a conforming manner about the base material layer 201, covering between about 20% and about 99% thereof. While the reinforcing member 150 may be in the form and morphology of wire armor, as depicted in FIG. 2 the base material layer 201 is nevertheless in surrounding relation with the reinforcing member 150. Therefore, the presence of air or space between the reinforcing member 150 and the base material layer 201 is substantially non-existent. Similarly, an outer material layer 200 may be disposed conformingly about the reinforcing member 150 such that it may also contact and bond to the base material layer 201 where space between wire armor of the reinforcing member 150 allows as shown in FIG. 2. The above described jacket 175 may be positioned about the inner tube 101 completing the structure of the hose 100 of FIG. 1.

The above described configuration of the hose 100 is of improved resistance to both blowout and compression. That is, rather than reliance on the jacket 175 alone to provide compression resistance, the structure of the inner tube 101 itself provides for compression resistance in a manner not attainable where a conventional porous aramid or similar fibrous material is employed. Thus, fatigue and isolated failures of the jacket 175 are unlikely to result in collapse of the hose 100 when positioned within a high pressure differential environment. By the same token, the hose 100 includes blowout resistance by employment of a reinforcing member 150 that, unlike a conventional aramid, lends itself to surrounding conformation by material layers 200, 201. The reinforcing member 150 may include wrapped or braided wire. Alternatively, an interlocking metallic tape may be employed. In one embodiment the reinforcing member 150 is brass, whereas the material layers 200, 201 are primarily of a polymer base for melting thereabout. As alluded to above, the polymer may be the same as that selected for the core 275. Thus, the inner tube 101 may be continuously bonded from the inside to the outside during manufacture as detailed below.

The above described configuration of the hose 100 achieves blowout and compression resistance by imbedding of the reinforcing member 150 within the material of the inner tube 101 (i.e. within the material layers 200, 201). However, as also indicated, the reinforcing member 150 is likely to be of an alloy or metal such as brass which may deteriorate or become brittle to a degree upon exposure to extreme induction heating temperatures. Nevertheless, from a manufacturing and workability standpoint, it may be difficult to provide the reinforcing member 150 about the base material layer 201 at the time of extrusion. Therefore, detailed below are techniques for transforming material layers 200, 201 into conformation about the reinforcing member 150 to provide the inner tube 101 with the noted unitary character in a manner that preferentially heats and melts the layers 200, 201 as compared to the reinforcing member 150.

Figure 3:
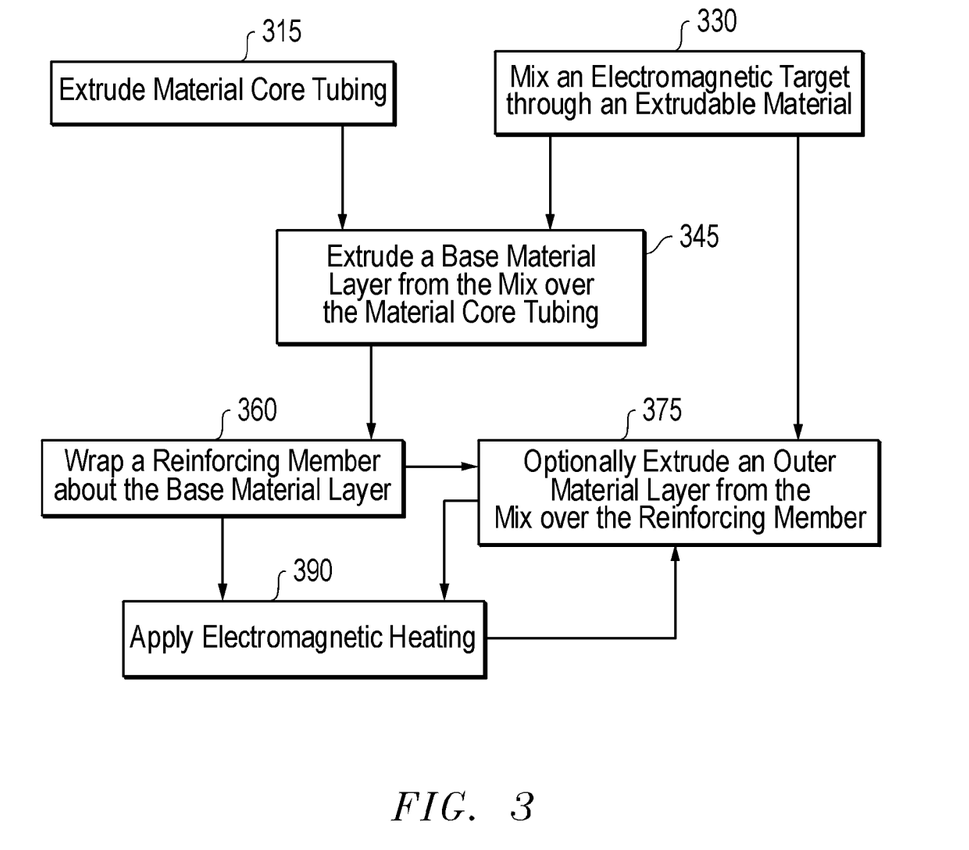
FIG. 3 is a flow-chart summarizing an embodiment of forming the hydrocarbon application hose of FIGS. 1 and 2.

Referring now to FIG. 3, with added reference to FIG. 2, a flow-chart is depicted summarizing an embodiment of forming a hydrocarbon application hose as described above. Namely, a mixture of an electromagnetic target 250 and an extrudable material is formed as indicated at 330. This mixture will be employed to form the above noted layers 200, 201 of the hydrocarbon application hose 100 of FIG. 1 (see 345, 375). The mixture may initially extruded over the material core 275 of tubing noted above as indicated at 315 and 345. In this manner, the material core 275 may provide solid substrate about which subsequent layers 200, 201 may be extruded. Alternatively, the material core 275 and base material layer 201 may be co-extruded or, in one embodiment, the inner tube 101 may be formed without a separate underlying material core 275 altogether.

Continuing with reference to FIGS. 2 and 3, the above described mixture of electromagnetic target 250 and extrudable material is configured to take advantage of the thermal conductivity of the target 250 to electromagnetic heating as indicated at 390. For example, a material chosen for the target 250 is of greater thermally conductive responsiveness to electromagnetic heating than material of the reinforcing member 150. Thus, during heating as indicated at 390, layers 201 and/or 200 may be melted and transformed into surrounding relation with the morphology of the reinforcing member 150 without subjecting the member 150 to heat resulting in any significant brittleness or other deterioration thereof.

In one embodiment, the noted mixture is of a carbon based fiber target disbursed through a conventional extrudable polymer such as a polyimide (e.g. nylon) or PTFE. The target may make up to about 15% of the mixture, preferably between about 2% and about 8%. On the other hand, a less thermally conductive material such as brass may be selected for the reinforcing member 150. Thus, an application of electromagnetic heating as indicated at 390, perhaps infrared heating, may result in melting and transforming of the layers 200, 201 without significant damage to the reinforcing member 150. In such an embodiment, the carbon fiber target 250 may be about twenty times the thermal conductivity of the brass reinforcing member 150 when exposed to infrared heating. Thus, effective melting and transformation of the substantially polymer layers 200, 201 may be achieved without the reinforcing member 150 reaching deleterious temperatures (e.g. in excess of about 900° C. for brass). Other polymers may be employed for the layers 200, 201 and/or the core 275 in addition to those noted above. These may include fluoropolymers, polyolefins, a high strength thermoplastic, a thermoplastic elastomer, or even a polyester or polyether polymer.

As indicated at 360, the reinforcing member 150 is wrapped about the base material layer 201 prior to electromagnetic heating as indicated at 390. However, in one embodiment, wrapping of the reinforcing member 150 about the base material layer 201 may occur during electromagnetic heating, perhaps with electromagnetic heating starting prior to completion of the wrapping. Additionally, wrapping of the reinforcing member 150 may include braiding or interweaving of wire of the reinforcing member 150 to increase blowout or compression resistance of the hydrocarbon application hose 100 (see FIG. 1).

The mixture of electromagnetic target 250 and extrudable material may be employed for either of the base material layer 201 and the outer material layer 200 as noted above and at 345 and 375. From a manufacturing standpoint, a variety of options are available in achieving the melting transformation of the layers 200, 201 about the reinforcing member 150. For example, electromagnetic heating may take place immediately following, or in conjunction with, the providing of the reinforcing member 150 as noted above. In this scenario, the outer material layer 200 may subsequently be extruded over the reinforcing member as indicated at 375 followed by the application of further electromagnetic heating as indicated at 390. However, in an alternate embodiment, the outer material layer 200 may be extruded over the reinforcing member 150 prior to the application of any electromagnetic heating such that the electromagnetic heating of 390 is employed to simultaneously melt the both layers 200, 201 about the reinforcing member 150.

In yet another embodiment, a separate outer material layer 200 may be forgone with base material layer 201 configured of a thickness to transform substantially completely about the reinforcing member 150 during the electromagnetic heating of 390. In such an embodiment, the reinforcing member 150 may be of sufficiently minimal profile and wire spacing to effectively allow for such a conformation of the base material layer 201 thereabout.

It is worth noting that once the inner tube 101 of the hose 100 has been formed as detailed hereinabove, the blowout and compression resistant capacity of the hose 100 has been substantially provided. Thus, a variety of components may be provided above the inner tube 101 other than just the jacket 175. For example, the inner tube 101 may now be wrapped with an added layer of reinforcing member to provide added blowout resistance. Even an aramid over the inner tube 101 may be employed without significant concern over reduced compression resistance. Furthermore, added layers of reinforcing members or other material layers may even be wrapped about the jacket 175.

Additionally, electrical conductors may be wrapped about the inner tube 101 (i.e. longitudinally disposed about the outer material layer 200)or provided integrally with the core 275 to provide current carrying capacity to the hose 100. Alternatively, the metallic reinforcing member 150 may double as a conductor in this regard and may even serve the function of a heat sink. Such metallic conductors may be insulated copper, nickel or aluminum varying in number from about 1 to about 60 or more. Insulated jackets about the conductors may be of insulating material and of stacked dielectric configurations as described in U.S. Pat. No. 6,600,108 incorporated herein by reference.

Referring now to FIG. 4 the hydrocarbon application hose 100 is depicted in the form of coiled tubing for a clean out operation at an oilfield 401. As shown, the coiled tubing hose 100 is advanced into the well 190 from a coiled tubing reel 410 through an injector 430. The well 190 is of horizontal architecture requiring that substantial force be applied to the hose 100 in order to advance it toward a clean out location 490. Nevertheless, the hose 100 is of both sufficient flexibility and drivability in order to deliver a clean out tool 450 to debris 470 at the location 490 for clean out.

In the embodiment shown, debris 470 may be clogging a fracture of a hydrocarbon production region 199 through which the well 190 runs. Therefore, a pressurized fluid may be driven through the hose 100 and to the clean out tool 450 for clean out of the debris 470. The fluid may be delivered at between about 2,500 PSI and about 15,000 PSI, preferably at about 5,000 PSI, in order to achieve sufficient clean out. Nevertheless, any significant pressure differential resulting through the hose 100 fails to cause blowout due to the blowout resistance of the hose 100 as detailed above. That is, with added reference to FIG. 2, the reinforcing member 150 and surrounding jacket 175 are of sufficient strength so as to avoid blowout.

In addition to blowout resistance, the hose 100 of FIG. 4 is collapse resistant. For example, with added reference to FIG. 2 again, prior to clean out, the hose 100 may have between about 100 PSI and 2,500 PSI of fluid pressure therethrough and perhaps a very low pressure differential as compared to the pressure within the well 190 itself. Nevertheless, the conforming monolithic or unitary character of the reinforcing member 150 and surrounding layers 200, 201 relative to one another fails to allow any significant influx of fluid pressure from the well 190 to traverse the jacket 175 and migrate along the inner tube 101 leading to collapse of the hose 100. That is, even in circumstances where isolated locations of the jacket 175 have deteriorated and allow pressurized well fluid to contact the inner tube 101, migration of the pressure below the jacket 175 causing hose collapse is avoided.

In one embodiment, the jacket 175 may be forgone in place of an inner tube 101 that is thick and robust enough to withstand the noted differential pressures within the well 190 without collapse in spite of exposure throughout the outer surface of the hose 100. This may involve use of a slightly less flexible inner tube 101. However, the difference may be more than made up for due to the removal of a comparatively inflexible steel jacket 175. That is, an overall more flexible hose 100 may be provided due to the absence of the jacket 175. In the case of coiled tubing applications this may allow for the use of an effective coiled tubing hose 100 that exceeds 1.5 inches in outer diameter with improved flexibility.

Figure 5:
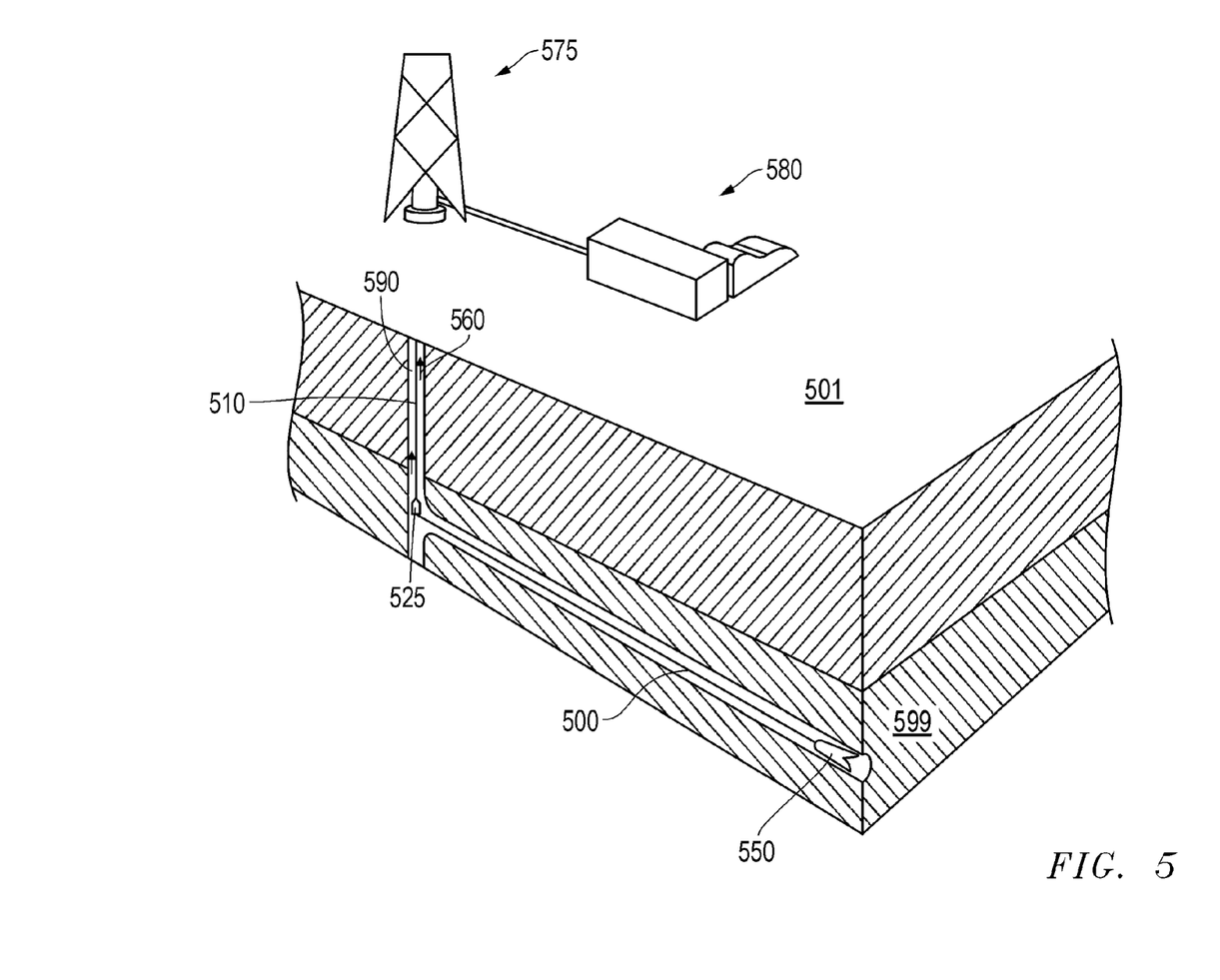
FIG. 5 is an overview of an alternate embodiment of a hydrocarbon application hose employed in a drilling operation at an oilfield.

Referring now to FIG. 5 an alternate embodiments of a hydrocarbon application hose 500 is depicted in use. In this embodiment, the hose is an umbilical drilling hose 500 employed at a drilling site 501. Mud and cuttings 560 may be drawn by a bit 550 from a production region 599 and through the hose 500. The drilling mud and cuttings 560 may be delivered to the main well 590 via a coupling 525 that joins the hose 500 to a main drilling cable 510 running from a drilling tower 575 thereabove. The drilling tower 575 may be coupled to a conventional circulating pump assembly 580 including a mud pump and reservoir. In this embodiment of FIG. 5, the hose 500 is sufficiently robust so as to carry the mud and cuttings 560 from a drill bit 550 without resulting in collapse of blowout.

Figure 6:
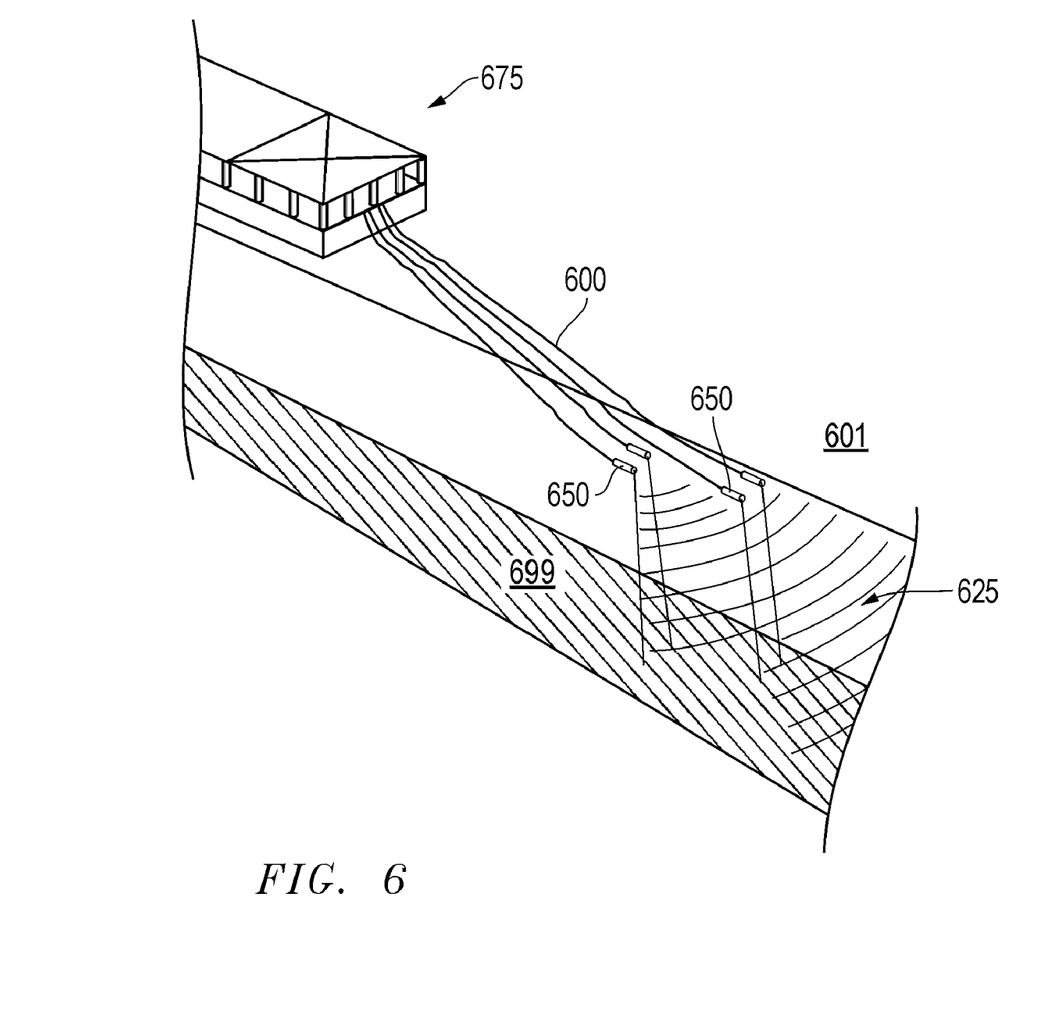
FIG. 6 is an overview of another alternate embodiment of a hydrocarbon application hose employed in an underwater seismic exploration operation.

In another embodiment depicted in FIG. 6, the hydrocarbon application hose is employed as a seismic gun hose 600 at an underwater exploration site 601. In this embodiment between about 1,000 PSI and about 3000 PSI of air may be shot through several hoses 600 being dragged from the end of a boat 675 at the site 601. The shot air may be used to generate seismic waves 625 from gun receiver assemblies 650 at the ends of the hoses 600. The seismic waves may return hydrocarbon related information to the assemblies 650 relative to a potential production region 699 therebelow. While the pressure differential may be increased during the noted dispensing of air through the hoses 600 and decreased therein at other times, the hoses 600 include the capacity to avoid blowout and collapse due to characteristics detailed hereinabove.

The above described embodiments of the hydrocarbon application hose 100 are with reference to its employment as coiled tubing. However, other types of hydrocarbon applications may benefit from use of a simultaneously compression and blowout resistant hose. For example, as depicted in FIG. 5, a hydrocarbon application hose 500 may be employed in the form of a drilling line for transporting of cuttings, mud, drilling fluid and other debris to a well 590. Additionally, as depicted in FIG. 6, hydrocarbon application hoses 600 may be employed in the form of gun cables for seismic hydrocarbon exploration.

Embodiments of the hydrocarbon application hose as described above achieve blowout resistance without primary reliance on an aramid braid or other material that might leave the hose susceptible to compression. As a result, fatigue and cracking of the hose jacket fails to lead to compression of the hose. This is a result of the employment of an underlying inner tube that incorporates a reinforcing member, generally of metallic wires or elements, that is conformingly surrounded by material layers of the inner tube resulting in a substantially non-porous monolithic or unitary inner tube configuration. Thus, a pressurized influx of fluid into the inner tube traversing the jacket from an area adjacent the hose resulting in its collapse may be avoided in conjunction with the blowout resistance. Indeed, the jacket may be thinner for added hose flexibility or eliminated altogether where the inner tube is of sufficient thickness and robustness to provide the aforementioned compression resistance. Furthermore, the substantially non-porous and unitary configuration of the inner tube is achieved in a manner that avoids subjecting the reinforcing member to processing conditions that tend to leave it brittle, deteriorated or otherwise compromised in terms of providing blowout resistance to the hose.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A hydrocarbon application hose comprising:
   a base material layer having an electromagnetic target disbursed therethrough;
   a material core, said base material layer disposed thereabout;
   a reinforcing member longitudinally coupled to said base material layer, said base material layer disposed in surrounding relation with said reinforcing member upon application of electromagnetic heating thereto; and
   an outer material layer having an electromagnetic target disbursed therethrough, said outer material layer disposed about said reinforcing member and said base material layer in surrounding relation with said reinforcing member upon application of electromagnetic heating thereto.

2. The hydrocarbon application hose of claim 1 wherein the electromagnetic heating is infrared heating.

3. The hydrocarbon application hose of claim 1 wherein the electromagnetic target is of greater thermally conductive responsiveness to the electromagnetic heating than said reinforcing member.

4. The hydrocarbon application hose of claim 3 wherein the electromagnetic target is a carbon based fiber.

5. The hydrocarbon application hose of claim 3 wherein said reinforcing member is comprised of brass.

6. The hydrocarbon application hose of claim 1 wherein said base material layer, said material core, and said outer material layer are comprised of the same polymer.

7. The hydrocarbon application hose of claim 1 further comprising an electrical conductor that is one of integral with said material core and longitudinally disposed about said outer material layer.

8. The hydrocarbon application hose of claim 1 wherein said reinforcing member is a first reinforcing member, the hydrocarbon application hose further comprising a second reinforcing member about said outer material layer.

9. The hydrocarbon application hose of claim 8 wherein said second reinforcing member is one of wire armor, metallic tape, and a fibrous material.

10. The hydrocarbon application hose of claim 1 wherein said reinforcing member is one of wire armor and metallic tape.

11. The hydrocarbon application hose of claim 1 wherein said reinforcing member serves as one of a heat sink and an electrical conductor.

12. The hydrocarbon application hose of claim 1 wherein said reinforcing member covers between about 20% and about 99% of said base material layer.

13. A hose for a hydrocarbon application in a hydrocarbon environment of a first pressure condition, the hose comprising an inner tube of substantially unitary configuration that further comprises:
   a base material layer having an electromagnetic target disbursed therethrough;
   a material core, said base material layer disposed thereabout;
   a reinforcing member longitudinally coupled to said base material layer, said base material layer in surrounding relation with said reinforcing member upon application of electromagnetic heating thereto, the inner tube defining a central passageway to undergo a second pressure condition; and
   an outer material layer having an electromagnetic target disbursed therethrough, said outer material layer disposed about said reinforcing member and said base material layer in surrounding relation with said reinforcing member upon application of electromagnetic heating thereto.

14. The hose of claim 13 wherein said inner tube provides to the hose compression resistance when the first pressure condition is greater than the second pressure condition and blowout resistance when the second pressure condition is greater than the first pressure condition.

15. The hose of claim 13 wherein the hydrocarbon environment is one of a well and an underwater site.

16. The hose of claim 15 wherein the hydrocarbon application is a seismic exploration at the underwater site and the hose is a seismic gun hose to accommodate up to about 3,000 PSI as the second pressure condition.

17. The hose of claim 15 wherein the hydrocarbon application is one of a coiled tubing application and a drilling application within the well.

18. The hose of claim 17 being an umbilical drilling hose for the drilling application.

19. The hose of claim 17 being coiled tubing for the coiled tubing application.

20. The hose of claim 19 wherein the coiled tubing exceeds about 1.5 inches in outer diameter.

21. The hose of claim 20 to accommodate up to about 20,000 PSI as the second pressure condition.

* * * * *